United States Patent [19]
Baer

[11] Patent Number: 5,083,649
[45] Date of Patent: Jan. 28, 1992

[54] CLUTCH RELEASE MECHANISM

[75] Inventor: Kurt R. Baer, Toledo, Ohio

[73] Assignee: Dana Corporation, Toledo, Ohio

[21] Appl. No.: 670,300

[22] Filed: Mar. 15, 1991

[51] Int. Cl.$^5$ ............................................. F16D 25/08
[52] U.S. Cl. .................... 192/98; 192/856 A; 192/91 A
[58] Field of Search ............... 192/856 A, 91 A, 98

[56] References Cited

U.S. PATENT DOCUMENTS

| | | | |
|---|---|---|---|
| 2,501,005 | 3/1950 | Rockwell | 192/91 A |
| 2,757,769 | 8/1956 | Roise | 192/91 A |
| 2,864,480 | 12/1958 | Sink | 192/91 A |
| 2,885,049 | 5/1959 | Staadt | 192/91 A |
| 3,687,253 | 8/1972 | Bjorklund | 192/91 A |
| 3,912,058 | 10/1975 | Parkins | 192/91 A |
| 4,102,446 | 7/1978 | Rist | 192/91 A |
| 4,456,111 | 6/1984 | Limbacher | 192/85 CA |
| 4,561,531 | 12/1985 | Young et al. | 192/91 A X |
| 4,585,106 | 4/1986 | Shirley | 192/91 A X |
| 4,585,107 | 4/1986 | Leigh-Monstevens | 192/85 CA |
| 4,585,108 | 4/1986 | Leigh-Monstevens | 192/85 CA |
| 4,585,109 | 4/1986 | Shirley et al. | 192/85 CA |
| 4,620,625 | 11/1986 | Ladin | 192/85 CA |
| 4,660,694 | 4/1987 | Nix et al. | 192/85 CA |
| 4,684,003 | 8/1987 | Leigh-Monstevens | 192/85 CA |
| 4,708,228 | 11/1987 | Leigh-Monstevens | 192/85 CA |
| 4,869,355 | 9/1989 | Corral et al. | 192/98 |
| 4,913,276 | 4/1990 | Hayashi et al. | 192/85 CA |
| 4,915,202 | 4/1990 | Leigh-Monstevens | 192/85 CA |
| 4,995,492 | 2/1991 | Babcock et al. | 192/85 CA |

*Primary Examiner*—Leslie A. Braun
*Assistant Examiner*—Nicholas Whitelaw
*Attorney, Agent, or Firm*—MacMillan, Sobanski & Todd

[57] ABSTRACT

An improved release mechanism for a hydraulically operated clutch. A tubular cylinder is formed between stationary inner and outer housings. A tubular piston has an inner end extending into the cylinder and has an outer end mounting a thrust bearing. Rotating clutch release levers engage the thrust bearing. One or more radial holes extend through the piston adjacent the inner end. Pins positioned in the holes extend into inner housing grooves which extend parallel to an axis of the release mechanism. The pins and grooves prevent rotation of the piston relative to the stationary housings, while allowing axial piston movement. A retainer ring is positioned in an annular groove in the exterior of the piston. The retainer ring both retains the pins in the piston holes and retains the piston in the cylinder.

8 Claims, 1 Drawing Sheet

CLUTCH RELEASE MECHANISM

TECHNICAL FIELD

The invention relates to hydraulic clutches and more particularly to an improved clutch release mechanism for releasing the drive through a hydraulically operated friction clutch.

BACKGROUND ART

In a typical hydraulically operated clutch, an inner tubular support member or inner housing is secured to a transmission housing. A drive shaft from a motor is connected through a friction clutch to a transmission input shaft which passes coaxially through the inner housing to the transmission. An annular piston is mounted to slide on the inner housing. A stationary outer housing in combination with the inner housing forms a cylinder surrounding an end of the piston. The inner housing, the outer housing and the piston form an expansion chamber for receiving pressurized hydraulic fluid. A bearing mounted on an opposite end of the piston engages release levers on the friction clutch. The bearing permits the release levers to rotate with the clutch, while the piston remains stationary. When pressurized hydraulic fluid is delivered to the chamber, the piston moves in an axial direction away from the transmission, moving the levers to disengage the clutch. When the hydraulic pressure in the chamber is released, clutch springs act on the release levers to push the piston back into the cylinder. During engagement and release of the clutch, the piston must move axially between an engaged position and a disengaged position. As the friction surface and other components of the clutch gradually wear, these positions gradually change. Consequently, the piston must be capable of moving over a greater path than is required at any given time to disengage and engage the clutch.

Typically, the piston is an expensive machined part which is shaped to mount the bearing, to receive various hydraulic seals, and to provide a stop which retains the piston in the cylinder. In some cases, a simple annular piston is formed separate from a machined bearing carrier. In order to reduce wear on the clutch release mechanism, it is desirable to confine the piston or the bearing carrier to axial movement relative to the stationary parts secured to the transmission, while preventing rotational movement. U.S. Pat. No. 4,660,702 shows the use of an elongated pin or bolt secured to the transmission to extend parallel to the axis of the clutch release mechanism. The piston moves a separate bearing carrier which is mounted to slide on the pin when moved in an axial direction. The pin or bolt prevents rotation of the bearing carrier. U.S. Pat. No. 2,757,769 shows forming a plurality of slots in the inner housing adjacent the thrust bearing. The slots extend parallel to the axis for the drive shaft. The piston is provided with a like plurality radial holes, each of which receives a ball bearing. The ball bearings extend into the slots to prevent rotation of the piston relative to the inner housing, while permitting the piston to slide in an axial direction. A thrust bearing is pressed on a stepped end of the piston both for engaging the rotating clutch release levers and for retaining the balls in the piston. Although this structure works well, the piston requires extensive machining during manufacture and consequently is expensive.

DISCLOSURE OF INVENTION

According to the invention, an improved low cost release mechanism is provided for a hydraulically actuated clutch. An annular cylinder is formed between annular inner and outer housings which are secured to be stationary relative to a transmission. The inner and outer housings are generally tubular shaped and extend coaxially about an input shaft to the transmission. A tubular clutch release piston has an inner end which extends into the cylinder and has an outer end on which a thrust bearing is mounted. A retainer ring is inserted into an annular groove formed on the exterior of the piston adjacent the outer end to position the thrust bearing on the piston. The inner housing, the outer housing and the piston form an expansion chamber for receiving hydraulic fluid to move the piston. Suitable sliding fluid seals and wiper seals are mounted on the inner housing and the outer housing to permit the piston to move axially relative to the housings without leakage of fluid from the cylinder.

According to the invention, one or more grooves are formed in the inner housing to extend in the cylinder parallel to the axis of the inner housing. One or more radial holes are provided adjacent the inner piston end, with one hole aligning with each inner housing groove. A pin placed in each hole projects inwardly into the adjacent inner housing groove to prevent rotation of the piston relative to the stationary inner and outer housings while permitting the piston to move in an axial direction while disengaging and engaging the clutch. An annular groove is formed in the exterior surface of the piston adjacent the inner end. The groove is located to intersect the pin holes. A retainer ring is positioned in the annular piston groove. The retainer ring serves dual functions of retaining the pins in the piston holes and of retaining the piston in the cylinder. If the piston is extended too far from cylinder, the retainer ring abuts the outer housing to retain the piston in the cylinder.

The piston comprises a simple tube which has one or more radial holes drilled adjacent the inner end and has two retainer ring grooves formed on its outer surface, one formed adjacent each end of the tube. Consequently, the piston is much simpler and much less expensive to manufacture than prior art pistons for clutch release mechanisms.

Accordingly, it is an object of the invention to provide an improved clutch release mechanism for a hydraulically operated friction clutch.

Other objects and advantages of the invention will be apparent from the following detailed description and the accompanying drawings.

BEST MODE FOR CARRYING OUT THE INVENTION

Figure 1:
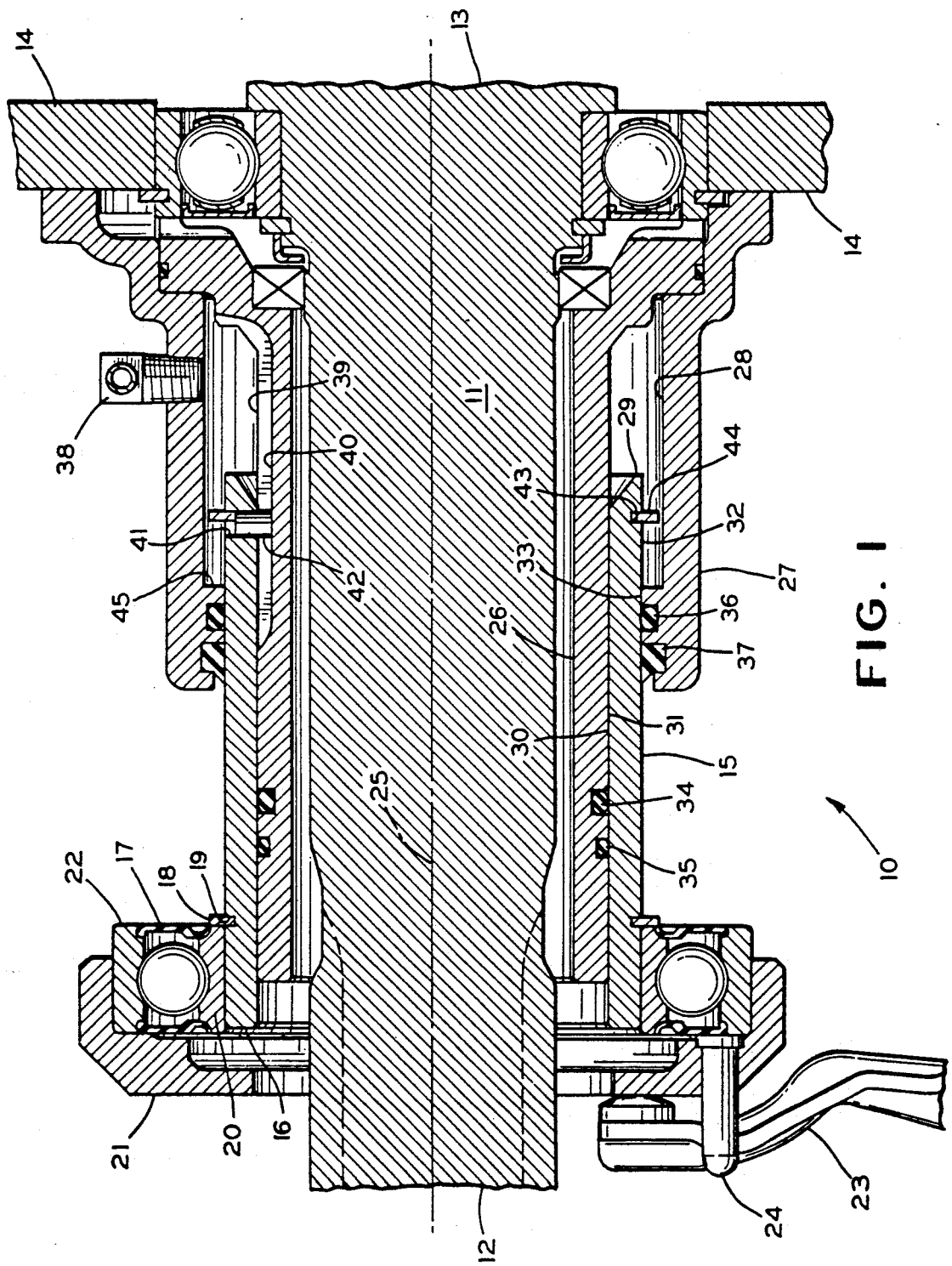
FIG. 1 is a fragmentary cross sectional view through an improved clutch release mechanism according to the invention.

Referring to FIG. 1, an improved clutch release mechanism 10 is illustrated according to the invention. The clutch release mechanism 10 is mounted to extend coaxially about a rotatable shaft 11. The shaft 11 has a splined end 12 which connects through a friction clutch (not shown) to an engine and has an end 13 which connects to a vehicle transmission (not shown). A fragmentary portion of a housing 14 for a transmission or a transmission bell is shown. The clutch release mechanism 10 is mounted on the housing 14, which remains stationary relative to the rotating shaft 11.

The clutch is operated by a tubular piston 15 which is moved in an axial direction by hydraulic pressure. The piston 15 has an outer end 16 on which a thrust bearing 17 is mounted. A retainer ring 18 is positioned in an annular groove 19 formed in an outer surface of the piston 15 adjacent the end 16. The bearing 17 has an inner race 20 which is pressed onto the piston end 16 and abuts the retainer ring 18. A thrust ring 21 is pressed onto an outer race 22 of the bearing 17. The bearing 17 permits the thrust ring 21 to rotate relative to the piston 15. A plurality of clutch release levers 23 (one shown) press against the thrust ring 21. One or more drive pins 24 project from the thrust ring 21. The clutch release levers 23 rotate with the clutch about the axis 25 of rotation for the drive shaft 11. The drive pin 24 rotates the thrust ring 21 with the release levers 23, while the bearing 17 allows the piston 15 to remain stationary. When the piston 15 is moved to the left in FIG. 1, the thrust ring 21 moves the release levers 23 to the left to disengage the clutch.

An inner housing 26 and an outer housing 27 cooperate to form an annular cylinder 28 for receiving an inner end 29 of the piston 15. The inner and outer housings 26 and 27 are secured to the housing 14 and may be either separate housing members, as shown, or an integral unit. The piston 15 has a cylindrical inner surface 30 which slides on and closely engages an outer surface 31 of the inner housing 26 and has a cylindrical outer surface 32 which slides on and closely engages an inner surface 33 of the outer housing 27. An annular fluid seal 34 and an annular wiper 35 are mounted on the inner housing 26 to form a sliding seal between the surfaces 30 and 31. Similarly, a fluid seal 36 and a wiper 37 are mounted on the outer housing 27 to form a sliding seal between the surfaces 32 and 33. A suitable source of hydraulic fluid (not shown) is applied, for example, through a fitting 38 to a chamber 39 formed between the cylinder 28 and the piston end 29. When hydraulic fluid is forced into the chamber 39, the piston 15 is moved to the left to disengage the clutch. When hydraulic pressure is relieved, a spring force exerted by the clutch on the release levers 23 forces the piston to the right and further into the cylinder 28. The seals 34 and 36 prevent fluid leakage from the chamber 39, while allowing the piston 15 to move.

In order to reduce wear on the piston 15 and on the surfaces contacted by the piston 15, the piston 15 must be confined to linear motion parallel to the axis 25. One or more grooves 40 are formed in the outer surface 31 of the inner housing 26. The grooves 40 are formed to extend parallel to the axis 25 and preferably are located in the chamber 39. One or more radial holes 41 are formed in the piston 15 adjacent the end 29. A member such as a ball or a pin 42 is positioned in each hole 41 to extend into an aligned groove 40. The pin 42 slides in the inner housing groove 40 as the piston 15 moves in an axial direction. At the same time, the pin 42 engages the groove to prevent rotation of the piston 15 relative to the stationary inner housing 26. By forming the grooves 40 in the chamber 39, the hydraulic fluid in the chamber 39 lubricates the pins 42 and the surfaces of the grooves 40 against which the pins 42 slide. An annular groove 43 is formed in the outer piston surface 32 to intersect each of the holes 41. A retainer ring 44 is positioned in the groove 43. The retainer ring 44 serves a dual function. First, by having the groove 43 intersect the holes 41, the retainer ring 44 keeps the pins 42 in the holes 41. Second, the retainer ring 44 serves as a stop to retain the piston 15 in the cylinder 28. As the piston 15 is withdrawn from the cylinder 28, the retainer ring 44 abuts an interior surface 45 on the outer housing 27 to prevent total withdrawal of the piston 15 from the cylinder 28.

The clutch release mechanism 10 differs from prior clutch release mechanisms in that the piston 15 is in the form of a simple tube having two exterior grooves 19 and 43 for receiving retainer rings 18 and 44, respectively, and having one or more radial holes formed adjacent the inner piston end 29. This construction is considerably less expensive to manufacture than a piston having complicated machined surfaces. Further, a single simple retainer ring 44 functions both to retain pins 42 in the piston holes 41 to prevent rotation of the piston 15 relative to the inner and outer housings 26 and 27 and to retain the piston 15 in the cylinder 28.

It will be appreciated that various modifications and changes may be made to the above described preferred embodiment of the clutch release mechanism 10 without departing from the spirit and the scope of the following claims.

I claim:

1. In a clutch release mechanism including inner and outer housings defining an annular cylinder and a piston having an inner end positioned to slide in an axial direction in said cylinder and an outer end mounting a bearing assembly for engaging rotating clutch release levers, said cylinder and said inner piston end forming a hydraulic fluid chamber, the improvement characterized by a groove formed in said inner housing to extend parallel to the piston axis, a radial hole through said piston adjacent said inner end, a member positioned in said radial hole to engage said inner housing groove, an annular groove formed in an exterior surface of said piston, said annular groove intersecting said radial hole, and a retainer ring positioned in said annular groove, said retainer ring both retaining said member in said hole and retaining said piston in said cylinder.

2. An improved clutch release mechanism, as set forth in claim 1, wherein said piston is tubular throughout its length.

3. An improved clutch release mechanism, as set forth in claim 2, wherein said piston has a second annular groove formed in the exterior piston surface adjacent said bearing assembly, and a second retainer ring positioned in said second annular groove, said second retainer ring abutting said bearing assembly.

4. An improved clutch release mechanism, as set forth in claim 3, wherein said member comprises a pin.

5. An improved clutch release mechanism, as set forth in claim 1, wherein said member comprises a pin.

6. An improved clutch release mechanism, as set forth in claim 5, wherein a plurality of grooves are formed in said inner housing, each of said inner housing grooves extending parallel to the piston axis, wherein a separate hole is formed in said piston adjacent said inner end to align with each inner housing groove, wherein a separate pin is positioned in each piston hole to extend into an adjacent one of said inner housing grooves, and wherein said annular retainer ring groove intersects each of said piston holes.

7. An improved clutch release mechanism, as set forth in claim 6, wherein said inner housing groove are located in said fluid chamber.

8. An improved clutch release mechanism, as set forth in claim 1, wherein said inner housing groove is located in said fluid chamber.

* * * * *